United States Patent
Heslop et al.

(10) Patent No.: US 8,114,945 B2
(45) Date of Patent: Feb. 14, 2012

(54) PROCESS CONTROL FOR THE (CO)-POLYMERISATION OF OLEFINS

(75) Inventors: David Heslop, Istres (FR); Eric Osmont, Martigues (FR)

(73) Assignee: Ineos Europe Limited, Hampshire (GB)

( * ) Notice: Subject to any disclaimer, the term of this patent is extended or adjusted under 35 U.S.C. 154(b) by 455 days.

(21) Appl. No.: 10/492,754

(22) PCT Filed: Oct. 14, 2002

(86) PCT No.: PCT/GB02/04641
§ 371 (c)(1),
(2), (4) Date: Apr. 16, 2004

(87) PCT Pub. No.: WO03/033550
PCT Pub. Date: Apr. 24, 2003

(65) Prior Publication Data
US 2004/0266959 A1 Dec. 30, 2004

(30) Foreign Application Priority Data
Oct. 26, 2001 (EP) .................................. 01430030

(51) Int. Cl.
C08F 2/00 (2006.01)
C08F 210/00 (2006.01)
C08F 4/00 (2006.01)

(52) U.S. Cl. ................ 526/67; 526/68; 526/69; 526/70; 526/348; 526/90

(58) Field of Classification Search .................. 526/901, 526/348, 67, 68, 69, 70, 90
See application file for complete search history.

(56) References Cited

U.S. PATENT DOCUMENTS
4,532,311 A * 7/1985 Fulks et al. ..................... 526/62
5,521,264 A 5/1996 Mehra et al.
6,218,484 B1 * 4/2001 Brown et al. ................... 526/68

FOREIGN PATENT DOCUMENTS
EP 0 866 077 A1 9/1998
WO WO 94/28032 12/1994
WO WO 99/53387 10/1999
WO WO 01/49751 A 7/2001

OTHER PUBLICATIONS

B. A. Krentsel et al., "Polymers and Copolymers of Higher α-Olefins," pp. 307-312, (1997).

* cited by examiner

*Primary Examiner* — William Cheung
(74) *Attorney, Agent, or Firm* — Nixon & Vanderhye

(57) ABSTRACT

Process for controlling the (co)polymerization of olefins in a continuous polymerization reactor wherein the olefin (co) polymerization is performed in an industrial plant reactor in the presence of a polymerization catalyst characterized in that at least one operating parameter of the plant is controlled by means of a measurement of the chain branching level (CBL) of the produced polymer.

6 Claims, 3 Drawing Sheets

Variation of Polymer Flex Modulus with Polymer Density $R^2 = 0.9255$
(Curve fit accuracy from Excel)

PROCESS CONTROL FOR THE (CO)-POLYMERISATION OF OLEFINS

BACKGROUND OF THE INVENTION

The present invention relates to a process for controlling the (co)polymerisation of olefins in a continuous polymerisation reactor. Preferably, the present invention relates to a process for controlling the gas-phase (co)polymerisation of ethylene in a continuous fluidised bed reactor.

Processes for the (co)polymerisation of olefins in the gas phase are well known in the art. Such processes can be conducted for example by introducing the gaseous monomer (and comonomer) into a stirred and/or gas fluidised bed comprising polyolefin and a catalyst for the polymerisation.

In the gas fluidised bed polymerisation of olefins, the polymerisation is conducted in a fluidised state by means of an ascending gas stream comprising the gaseous reaction monomer. The start-up of such a polymerisation generally employs a bed of polymer particles similar to the polymer that it is desired to manufacture. During the course of polymerisation, fresh polymer is generated by the catalytic polymerisation of the monomer, and polymer product is withdrawn to maintain the bed at more or less constant volume. An industrially favoured process employs a fluidisation grid to distribute the fluidising gas to the bed, and to act as a support for the bed when the supply of gas is cut off. The polymer produced is generally withdrawn from the reactor via a discharge conduit arranged in the lower portion of the reactor, near the fluidisation grid. The fluidised bed consists in a bed of growing polymer particles. This bed is maintained in a fluidised condition by the continuous upward flow from the base of the reactor of a fluidising gas.

The polymerisation of olefins is an exothermic reaction and it is therefore necessary to provide means to cool the bed to remove the heat of polymerisation. In the absence of such cooling the bed would increase in temperature and, for example, the catalyst becomes inactive or the bed commences to fuse. In the fluidised bed polymerisation of olefins, the preferred method for removing the heat of polymerisation is by supplying to the polymerisation reactor a gas, the fluidising gas, which is at a temperature lower than the desired polymerisation temperature, passing the gas through the fluidised bed to conduct away the heat of polymerisation, removing the gas from the reactor and cooling it by passage through an external heat exchanger, and recycling it to the bed. The temperature of the recycle gas can be adjusted in the heat exchanger to maintain the fluidised bed at the desired polymerisation temperature. In this method of polymerising alpha olefins, the recycle gas generally comprises the monomer and comonomer olefins, optionally together with, for example, an inert diluent gas such as nitrogen or a gaseous chain transfer agent such as hydrogen. Thus, the recycle gas serves to supply the monomer to the bed, to fluidise the bed, and to maintain the bed at the desired temperature. Monomers consumed by the polymerisation reaction are normally replaced by adding make up gas or liquid to the polymerisation zone or reaction loop.

The physical properties of polymer products are well known to those skilled in the art as being dependent on properties such as density, molecular weight and molecular distribution. (Polypropylene and other Polymers Polymerization and Characterization, Ser van der Ven, Studies in Polymer Science 7, Elsevier, 1990). In this paper, branch length is also stated as appearing to play a role in polyethylene properties, not only in the case of melt flow, which in LLDPE behaves in a different manner from other kinds of polyethylenes, but also in more subtle ways. The author illustrates how the ESCR of a polymer increases with increasing branch length from methyl to hexyl.

The author also explains that in terms of strength properties, such as stiffness and yield stress, there exists a unique relation with density for all types of polyethylene including LDPE; stiffness etc. decreasing with increasing density. Density is not a primary independent variable from the polymer synthesis point of view, but not surprisingly the crystallinity is the overriding property determining strength in polymer, and density is a very good measure of this.

In Polymers and Copolymers of Higher alpha Olefins, B. A. Krentsel, Y. V. Kissin, V. J. Kleiner, L L. Stotskaya, Hanser Publishers, 1997, data is presented in Table 8.22 showing how the mechanical modulus measured in Mpa of Ethylene/alpha Olefin Copolymers varies with polymer density and crystallinty. This data shows that the flex modulus behaviour is linear with density in the range 0.92 g/cm3 to 0.96 g/cm3. This is illustrated in FIG. 1.

A polymerisation reactor is typically controlled to achieve a desired melt index and density for the polymer at an optimum production. Beyond density and melt index requirements, it is also very important to achieve a combination of superior polymer properties including e.g. die swell, environmental stress cracking resistance (ESCR), rigidity as measured by either top load resistance or flexural modulus and impact. Consequently, the man skilled in the art is always looking, within the constraints of conventional, safe operation, to improve the way to control the operating parameters of the plant.

It has been found that density measurement and control is not the optimum technique to ensure that the process produces polymers with target die swell, environmental stress cracking resistance (ESCR), rigidity and impact. The present invention provides means to monitor and control stability of the entire polymerisation zone; particularly for high space time yield polymerisation processes. Beyond stability, the present invention provides means to control the process operating parameters in order to achieve the desired combination of superior polymer properties including e.g. die swell, environmental stress cracking resistance (ESCR) rigidity and impact.

According to the present invention, the chain branching level (CBL) has been found to be a simple and effective property in monitoring and maintaining control of polymer properties throughout the polymerisation zone and thereby optimising the stability of the fluidised bed and control of the overall polymerisation process.

SUMMARY OF THE INVENTION

Thus, according to the present invention, there is provided a process for controlling the (co)polymerisation of olefins in a continuous polymerisation reactor wherein the olefin (co)polymerisation is performed in an industrial plant reactor in the presence of a polymerisation catalyst characterised in that at least one operating parameter of the plant is controlled by means of a measurement of the chain branching level (CBL) of the produced polymer.

DETAILED DESCRIPTION OF THE INVENTION

Figure 1:
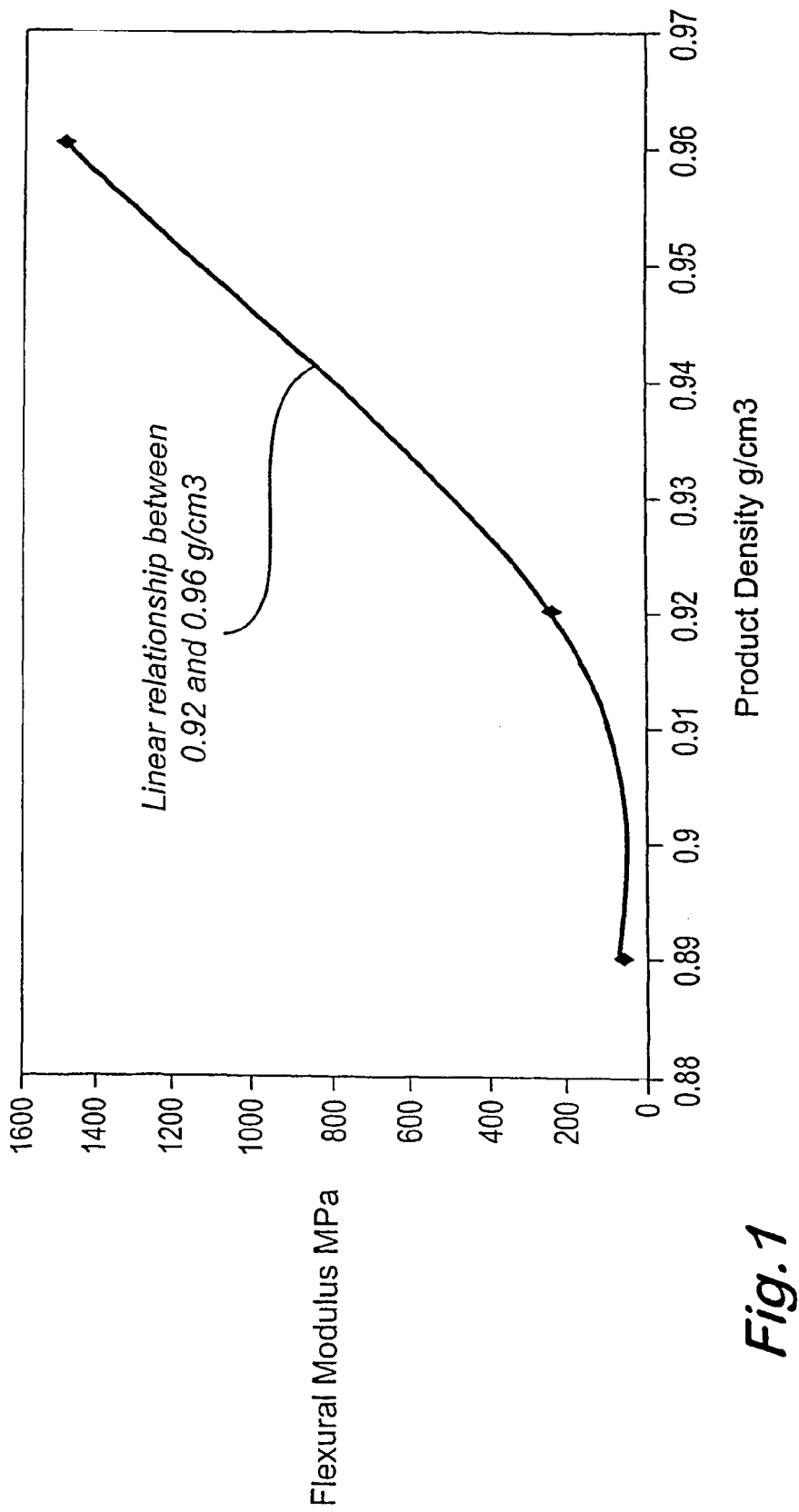
FIG. 1 is a graph showing the relationship between flexural modulus and polymer density.
Figure 2:
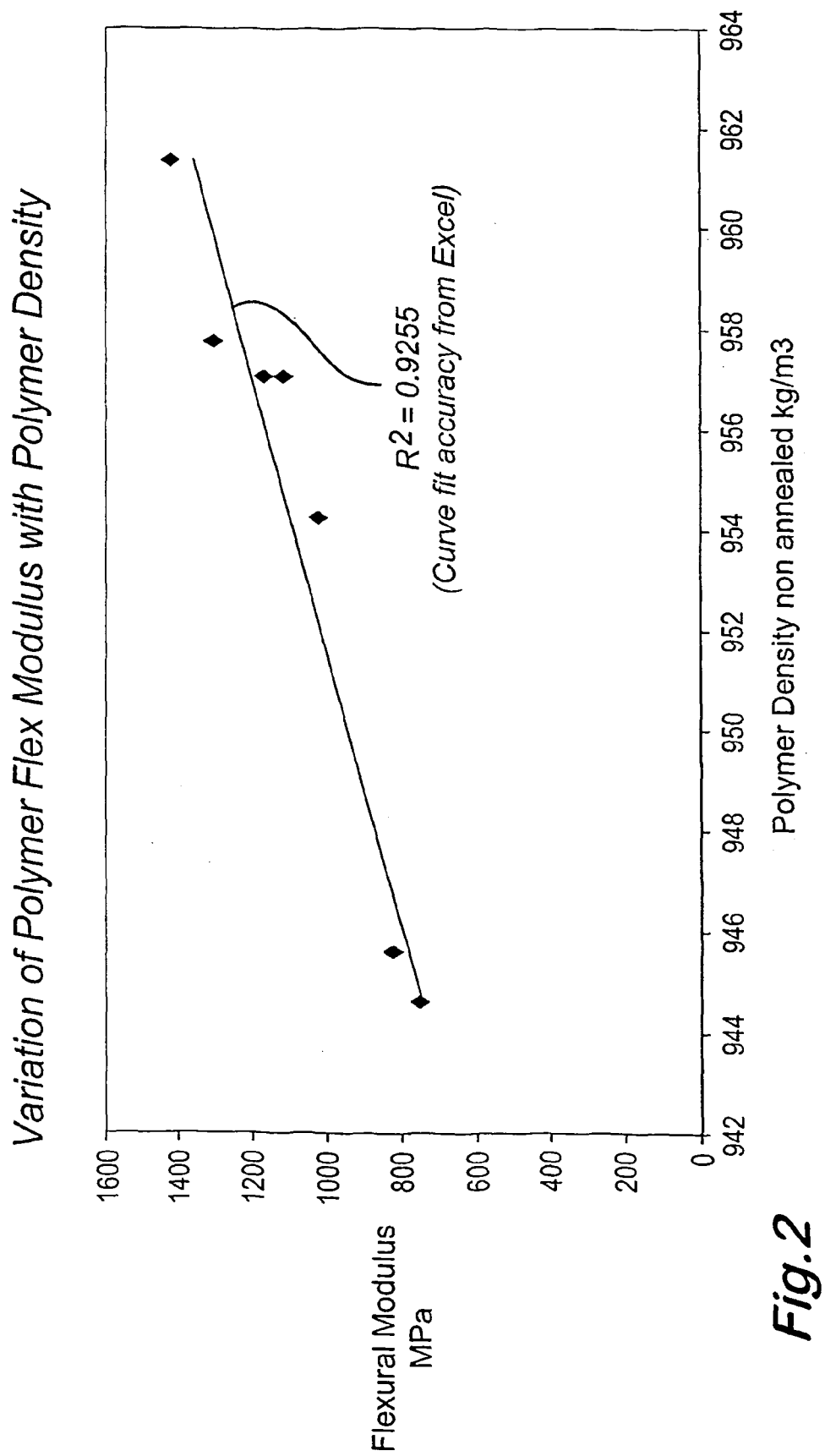
FIG. 2 is a graph showing the variation of polymer flexural modulus with polymer density.

The advantage of this invention is illustrated here after where FIG. 2 shows how the polymer flexural modulus varies with polymer density over a range of densities. It can be seen that the polymer properties follow a linear type relationship as described in the literature however when the data points are linearised using a standard spread sheet curve fitting function, the curve fitting accuracy or R2 value is 0.9255 and is not equal to 1 and therefore the data is not linear. This means that variations in polymer density can produce unwanted changes in polymer properties.

Figure 3:
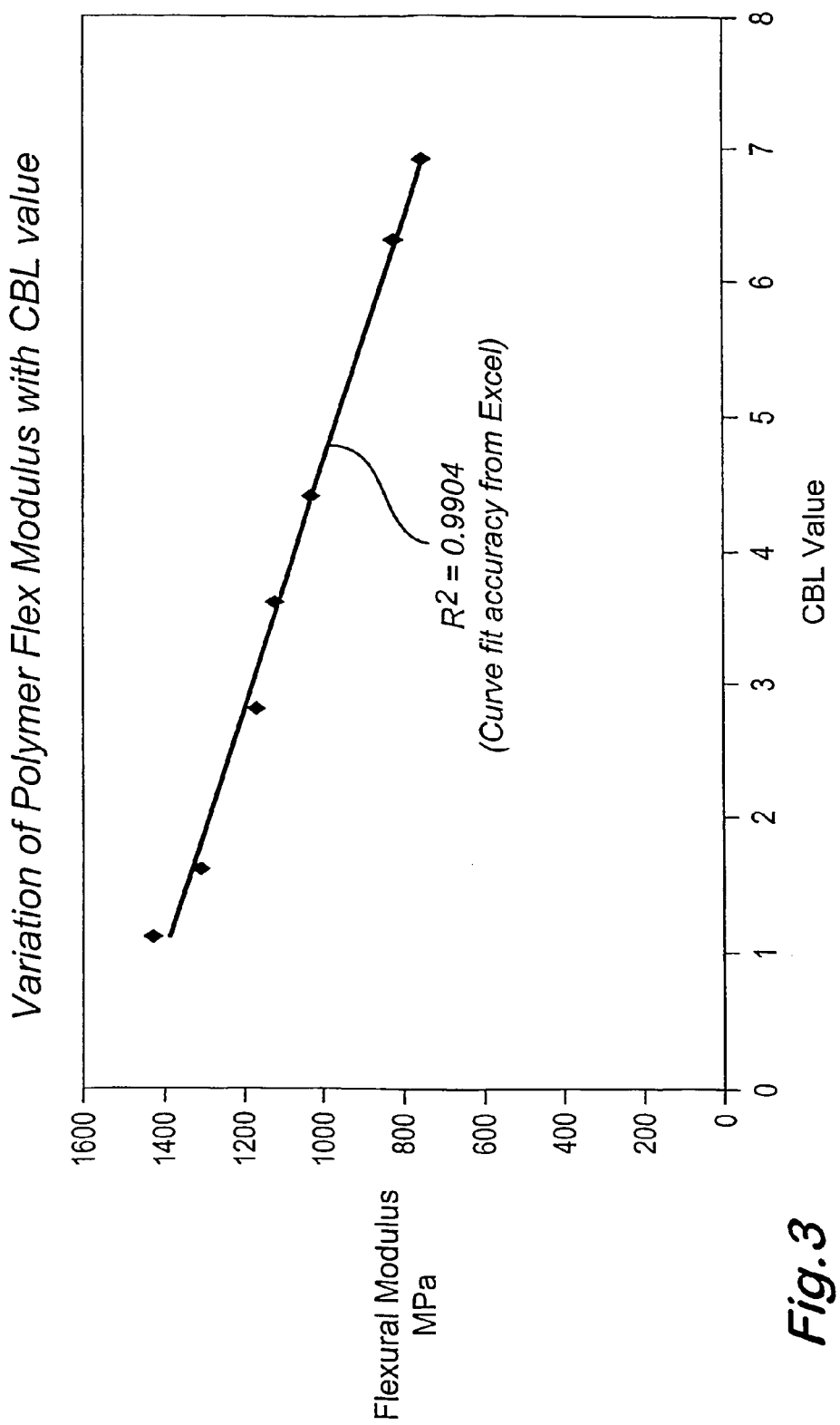
FIG. 3 is a graph showing the variation of polymer flexural modulus with CBL value.

FIG. 3 shows how polymer flexural modulus varies with CBL for the same set of samples. It can be seen that when the data points are linearised with a standard spreadsheet curve fitting function the curve fitting accuracy or R2 value is 0.9904. This value is closer to 1 than the previous example and therefore measurement and control of CBL results in improved operation of the plant and stability of polymer properties.

For the purposes of the present invention and appended claims, the CBL means the average frequency of branches along the copolymers backbone and at its extremity expressed in number of branches per thousand carbons. For low CBL polymers, 13C Nuclear Magnetic Resonance (NMR) is the preferred mean of measuring CBL. This technique can also identify the chemical composition of branches used for CBL computation. Most common branches in olefin copolymers are side chains methyl, end chain methyl, side chain ethyl, side chain butyl, side chain hexyl, end chain vinyl, and others type of hydrocarbon groups.

NMR gives also access to low level of CBL—down to 0.1/1000C depending on the equipment senility and the branches nature. Experimental protocols for qualitative and quantitative determination of CBL are available in the open literature (see D. X. Axelson, G. C. Levy, L. Madelkern, Macrolomecules, 1979, 12, 41-52).

Nevertheless, NMR measurement is not ideal for reactor monitoring which requires faster response time and higher sampling frequency. Alternative faster techniques can be applied including Fourier Transform Infra Red Spectrometry or Pyrolysis coupled with Gas Chromatography after calibration by NMR. Once aware of the CBL control, the man skilled in the art will be capable of determining optimal operating conditions and maintaining the value of the CBL within the optimal limits by appropriately selecting reaction process conditions and by appropriately designing polymerisation reaction systems to ensure operation within these optimal limits to produce the desired polymer. The choice of the preferred design for the reaction system and/or the preferred operating conditions to act on may depend on the plant design, the catalyst system, the polymerisation temperature, the residual catalyst level in the polymer, the catalyst activation temperature, etc.

According to a preferred embodiment of the present invention, and for the purposes of the present invention and appended claims, measurement of the chain branching level (CBL) of the produced polymer means a numerical measurement obtained by using an experimental analytical procedure which is applied to the produced polymer.

According to a simple and preferred method of the present invention, once the usual operating conditions have been selected for the manufacture of a given polymer grade, if the monitoring of the CBL indicates a dangerous decrease/increase approaching the limit value then one or more actions can be taken.

For example, the CBL can be increased or decreased, as desired, by increasing or decreasing the catalyst yield. Catalyst yield can be altered by one or any combination of the following methods:

Maintaining ethylene feed to the reactor constant and measuring and adjusting catalyst feed Maintaining catalyst feed to the reactor constant and measuring and adjusting ethylene feed, fluidised bed height, fluidised bulk density in any part of the bed or comonomer feed to the reactor.

Maintaining catalyst feed to the reactor and adjusting ethylene partial pressure Sending part or all of the reactor feedstreams through a feed treatment unit. Sending all or part of the reactor recycle streams through a treatment unit. Sending all or part of the monomer, commoner and inerts recovered in the product degassing section through a treatment system prior to re-introducing it into the reactor. Feed treatment units, treatment units and treatment systems are process equipment designed to remove one or any combination of impurities, e.g. carbon monoxide, oxygen, carbon dioxide, acetylene, N2O, ammonia or water or polar compounds such as alcohols, aldehydes, ketones, peroxides and organic acids. The methods used to remove these impurities are for example beds of copper or lead oxide on alumina, molecular sieves, hydrogenation catalysts, supported copper catalyst or solid caustic.

Adding a catalyst activity inhibitor to all or part of the reactor feedstreams, recycle streams, monomer, comonomer and inerts recovered in the degassing sections or to the fluidised bed reactor or the main loop or any of its components. Examples of catalyst activity inhibitors are oxygen, water, carbon monoxide, carbon dioxide, ammonia, polar compounds such as alcohols, aldehydes, ketones and peroxides Adding a catalyst activity promoter to all or part of the reactor feedstreams, recycle streams, monomer, comonomer, and inerts recovered in the degassing sections or to the fluidised bed reactor or the main loop or any of its components. Examples of activity promoters are organoalkyls such as Tri ethyl aluminium, Tri ethyl boron, Tri n Octyl Aluminium, Tri isobutyl Aluminium.

Measurement of any of the above parameters and adjustment of operating parameters can be done in response to the control of the CBL level in the reactor.

Maintenance of the reaction system and start up after construction of the reaction system are operations that can result in the presence of catalyst activity inhibitors. Hence during these operations particular care must be taken to control the presence of these inhibitors to control the CBL of the polymer.

Maintenance of any item in the reaction loop, or of the cyclone, exchanger, compressor, high productivity or enhanced high productivity, pump, catalyst injection system product withdrawal or withdrawal gas recycle system or the reactor requires that it is shutdown, taken out of service, freed from hydrocarbon and opened to the atmosphere to provide a safe working environment. This operation brings oxygen and atmospheric moisture into contact with the process where it's presence on restart would affect catalyst activity and hence CBL control. The following techniques can be used to avoid the ingress of these activity inhibitors and hence provides CBL control at restart.

Maintenance of a nitrogen atmosphere in the aforesaid equipment item whilst it is out of service.

Maintenance of a dry atmosphere using air dried to a dew point of 0° C. or lower in the afore said equipment item whilst it is out of service Purging the equipment with nitrogen dried to a dew point of 0° C. or less prior to it being brought back into use.

During construction of gas phase reactors and systems, debris and residues may accumulate in the system or be present on the surface of piping and equipment.

The removal of oil, grease, dust, dirt, mill scale, rust, coatings, oxides, corrosion products, bitumen and other foreign products removes potential sources of catalyst activity inhibitors and provides CBL control. Examples of removal techniques that can be used are chemical cleaning, blast cleaning, solid carbon dioxide blasting and washing, rinsing or flushing with an inert hydrocarbon which can be chosen amongst one or more of the C2-C8 alkane(s) or cycloalkane(s), particularly pentane or hexane. These techniques can be used separately or in combination. At the end of the cleaning procedure catalyst activity inhibitor ingress can be inhibited by maintaining the piping or equipment under a nitrogen or an air atmosphere of dew point 0° C. or lower.

Carrying out any of the above activities is a means for control of CBL after maintenance or at reactor commissioning or start up.

The CBL level can also be controlled by varying the catalyst activation temperature.

The CBL level can also be controlled by introducing additives to the activator such as fluorine.

The CBL level can also be controlled by changing the silica support from granular to microspheroidal.

The CBL level can also be controlled by adjusting the particle size of the catalyst support.

The CBL level can also be controlled by adjusting the hydrogen partial pressure in the reactor.

The CBL level can also be controlled by adjusting the partial pressure of comonomer present in the reactor or changing the flow rate of the comonomer being introduced to the reaction system.

Thus, according to another embodiment of the present invention, there is provided a process for controlling a continuous fluidised bed reactor (co-)polymerisation process which comprises:
1. withdrawing from the reactor a hot recycle stream comprising at least an olefin,
2. cooling part or all of said recycle stream withdrawn from said reactor, and 3.
recycling part or all of said cooled recycle stream comprising the olefin through the polymerisation zone in said reactor in the presence of a polymerisation catalyst under reactive conditions, characterised in that the CBL is determined and controlled in order to maintain said CBL within a predefined range of values.

This control can be especially made through one or more of the following actions:
a) adjustment of catalyst yield
b) adjustment of activation temperature
c) adjustment of catalyst particle size
d) adjustment of catalyst particle shape
e) addition of fluorine to the catalyst during the activation step
f) adjustment of the hydrogen partial pressure An inert hydrocarbon may be added to the reaction gases in order to increase the heat removal from the polymerisation zone or to increase the catalyst activity or to increase the inert hydrocarbon absorption into the polymer. Hydrocarbon absorption in the polymer is subject to multi-component interaction effects, so the degree of absorption of, for example, the inert hydrocarbon, can also affect the degree of absorption of reactants, particularly co-monomers. For example, the inert hydrocarbon can be chosen amongst one or more of the C2-C8 alkane(s) or cycloalkane(s), particularly butane, pentane or hexane.

The hot recycle stream withdrawn from the reactor usually comprises unreacted gaseous (co)monomers, and optionally, inert hydrocarbons, inert gases such as nitrogen, reaction activators or moderators such as hydrogen, as well as entrained catalyst and/or polymer particles. The cooled recycled stream fed to the reactor additionally comprises make-up reactants (gaseous or liquid) to replace those reactants polymerised in the polymerisation zone.

The process according to the present invention is especially suitable for the manufacture of polymers in a continuous gas fluidised bed process.

Illustrative of the polymers which can be produced in accordance with the invention are copolymers of ethylene and/or propylene and/or butene. Preferred alpha-olefins used in combination with ethylene and/or propylene and/or butene in the process of the present invention are those having from 4 to 8 carbon atoms. However, small quantities of alpha olefins having more than 8 carbon atoms, for example 9 to 40 carbon atoms (e.g. a conjugated diene), can be employed if desired. Thus it is possible to produce copolymers of ethylene and/or propylene and/or butene with one or more C4-C8 alpha-olefins. The preferred alpha-olefins are but-1-ene, pent-1-ene, hex-1-ene, 4-methylpent-1-ene, oct-1-ene and butadiene. Examples of higher olefins that can be copolymerised with the primary ethylene and/or propylene monomer, or as partial replacement for the C4-C8 monomer are dec-1-ene and ethylidene norbornene. According to a preferred embodiment, the process of the present invention preferably applies to the manufacture of polyolefins in the gas phase by the copolymerisation of ethylene with but-1-ene and/or hex-1-ene and/or 4MP-1.

The process according to the present invention may be used to prepare a wide variety of polymer products for example linear low density polyethylene (LLDPE) based on copolymers of ethylene with but-1-ene, 4-methylpent-1-ene or hex-1-ene and high density polyethylene (HDPE) which can be for example copolymers of ethylene with a small portion of higher alpha olefin, for example, but-1-ene, pent-1-ene, hex-1-ene or 4-methylpent-1-ene.

When liquid condenses out of the recycle gaseous stream, it can be a condensable monomer, e.g. but-1-ene, hex-1-ene, 4-methylpent-1-ene, cyclo-octene, 1-pentene or octene used as a comonomer, and/or an optional inert condensable liquid, e.g. inert hydrocarbon(s), such as C4-C8 alkane(s) or cycloalkane(s), particularly butane, pentane or hexane.

The process is particularly suitable for polymerising olefins at an absolute pressure of between 0.5 and 6 MPa and at a temperature of between 30*C. and 130*C. For example for LLDPE production the temperature is suitably in the range 75-100° C. and for HDPE the temperature is typically 80-120° C. depending on the activity of the catalyst used and the polymer properties desired.

According to a preferred embodiment of the present invention, the process is especially suitable for the production of ethylene (co)polymers showing an environmental stress cracking resistance (ESCR) comprised between 1 to 500 h Preferably between 1 and 20 h. The ESCR is measured according to ASTM D 1693-00 (F50, 50° C. 10% Igepal)

According to a preferred embodiment of the present invention, the process is especially suitable for the production of ethylene (co)polymers showing a flexural modulus superior to 700 MPa determined on compression moulded plaque according to the test methods ISO 178-93 and ISO 293-86.

According to a preferred embodiment of the present invention, the process is especially suitable for the production of ethylene (co)polymers showing a charpy impact value of at least 5 KJ/M2 determined on compression moulded plaque according to the test methods ISO 179 and ISO 293-86.

According to a preferred embodiment of the present invention, the process is especially suitable for the production of ethylene (co)polymers showing a drop impact value of at least 0.5 m determined on one-litre blow moulded containers according to ASTM D 2463-95.

The polymerisation is preferably carried out continuously in a vertical fluidised bed reactor according to techniques known in themselves and in equipment such as that described in European patent application EP-0 855 411, French Patent No. 2,207,145 (U.S. Pat. No. 3,922,322), French Patent No. 2,335,526, EP-6 99 213 (U.S. Pat. No. 5,541,270), EP-89691 or U.S. Pat. No. 5,352,749. The process of the invention is particularly well suited to industrial-scale reactors of very large size.

The apparatus can comprise essentially a fluidised-bed polymerisation reactor comprising a vertical cylinder equipped with a fluidisation grid and supporting a disengagement chamber, a conduit for recycling the gas mixture, connecting the top of the disengagement chamber to the base of the reactor, which recycle conduit is provided with at least one heat exchanger and a gas compressor and with a conduit for introducing alpha-olefins. During the course of the polymerisation the bed comprises catalyst particles, growing polymer particles and formed polymer particles. The bed is maintained in a fluidised state by introducing a fluidising medium at a sufficient flow rate to cause the particles to separate and act as a fluid. The fluidising medium may consist of a single phase e.g. a gas phase or it may be two phase for example it may consist of a gas phase and a liquid phase, for example, a mixture of gas and entrained liquid. In such a case the quantity of liquid in the gas phase may be about from 1-50 weight percent, for example 10-20 weight percent, preferably less than 15 weight percent, provided always that the velocity of the two-phase fluidising medium is high enough to keep the liquid phase in suspension in the gas and to support the fluidised bed in the reactor. The two-phase fluidising medium of gas and entrained liquid may be formed by cooling part or all of the unreacted fluids from the reactor below the dew point and re-introducing said two-phase mixture into the reactor. Alternatively a two-phase fluidising medium may be formed within the reactor, for example by separately injecting e.g. underneath a fluisisation grid or directly into the fluidised bed, gas and liquid under conditions which will produce a two-phase fluidising medium. A single phase fluidising medium or a substantially single phase fluidising medium such as a gas phase fluidising medium may be formed by cooling a recycle gaseous stream to a temperature sufficient to form a liquid and a gas and by separating the liquid from the gas and then feeding the gas into the reactor, for example by injection below the fluidisation grid.

Alternatively, the recycle gaseous stream may be divided into a first stream and a second stream. The first stream is passed directly to the reactor in a conventional way by injection below the fluidisation grid and the second stream is cooled and the stream is separated into a gas and liquid stream. The gas stream may be returned to the first stream and re-introduced into the reactor below the bed, for example, below the fluidisation grid if such a grid is employed.

The fluidising medium may contain unreacted gaseous monomers, make-up monomers to replace monomers consumed by the polymerisation reaction, and optionally inert hydrocarbons e.g. ethane, propane, butane, isobutane or isopentane, inert gases such as nitrogen, reaction activators or moderators e.g. hydrogen.

The fluidisation grid positioned above the point of recycle ensures proper distribution of the fluidising medium to the bed and acts as a support for the bed when the supply of gas is cut off.

The polymerisation reaction may be carried out in the presence of a catalyst system of the Ziegler-Natta type, said catalyst essentially comprising a compound of a transition metal.

High-activity catalyst systems have already been known for a number of years and are capable of producing large quantities of polymer in a relatively short time, and thus make it possible to avoid a step of removing catalyst residues from the polymer. These high-activity catalyst systems generally comprise a solid catalyst consisting essentially of atoms of transition metal (preferably titanium and/or vanadium and/or zirconium), of magnesium and of halogen.

The Ziegler-Natta type catalyst can be used directly as such or in the form of a prepolymer. The conversion to prepolymer is generally carried out by bringing the catalyst into contact with one or more alpha-olefins in amounts such that the prepolymer contains between 0.002 and 10 millimol of transition metal per gram.

A co-catalyst may also be advantageously used with the Ziegler-Natta catalyst such as organometallic compounds of metals belonging to Groups I, II or III of the Periodic Table of the elements, in particular organoaluminium compounds.

The process is also particularly suitable for use with Ziegler catalysts supported on silica. Preferred catalyst systems for use in the present invention ate those disclosed in WO9309147, WO9513873, WO9534380 and WO9905187, the content of which is hereby incorporated by reference.

The polymerisation reaction may also be carried out using a metallocene type catalyst such as those described in EP 0 129368 (U.S. Pat. No. 5,580,839), EP 01206794 (U.S. Pat. No. 4,808,561), EP 0 420436 (U.S. Pat. No. 5,055,438) and EP 0 416815 (U.S. Pat. No. 5,703,187) the subject matter of which is incorporated herein by reference.

It is also possible to use late transition metal e.g. platinum or palladium, catalyst complexes such as those described in WO 9623010 (U.S. Pat. No. 5,866,663) the subject matter of which is incorporated herein by reference.

The process can also be applied with the iron and/or cobalt complexes catalysts, e.g. such as those disclosed in WO98/27124 (U.S. Pat. No. 5,955,555) or in WO99/12981.

It is also possible to use a high-activity catalyst consisting essentially of a chromium oxide activated by a heat treatment and associated with a granular or microspheroidal support based on a refractory oxide. This high activity chromium catalyst may be modified by the presence of titanium or aluminium of fluorine The catalyst may suitably be employed in the form of a prepolymer powder prepared beforehand during a prepolymerisation stage with the aid of a catalyst as described above. The prepolymerisation may be carried out by any suitable process, for example, polymerisation in a liquid hydrocarbon diluent or in the gas phase using a batch process, a semi-continuous process or a continuous process.

For details on prepolymerisation see U.S. Pat. Nos. 4,923,833, 5,283,278 and 4,921,825 and EP-B-0279 863(U.S. Pat. No. 5,654,248) all of which are herein fully incorporated by reference.

In another embodiment of the invention, the catalyst system of the invention includes an antistatic agent, for example, those described in U.S. Pat. No. 5,283,278, which is fully incorporated herein by reference. Non-limiting examples of antistatic agents include, alcohol, thiol, silanol, diol, ester, ketone, aldehyde, acid, amine, and ether compounds. Tertiary amines, ethoxylated amines, and polyether compounds are preferred. The antistatic agent can be added at any stage in the formation of the supported catalyst system of the invention.

In another embodiment of the invention, the catalyst system of the invention includes a polyolefin wax or tackifier or the like.

The catalyst may also be injected directly into the reaction zone as a dry solid or in suspension in a condensable monomer, e.g. but-1-ene, hex-1-ene, 4-methylpent-1-ene, cyclooctene, 1-pentene or octene and/or an optional inert condensable liquid, e.g. inert hydrocarbon(s), such as C4-C8 alkane(s) or cycloalkane(s), particularly butane, pentane or hexane.

A further benefit of using these predefined safe operating limits is to improve the speed and safety associated with start-ups and grade transitions. When changing grades, the compositions of monomers and hydrogen and the product properties may be changing continuously, the quantity of absorption of monomers in the polymer will additionally be altered by the changing product properties (principally density) and gas composition. The control of the CBL within tight predetermined limits enables the speed of start-ups and transitions to be improved and the production of wide-specification material formation to be minimised.

The following Examples will now illustrate the present invention:

EXAMPLE 1

Measurement and Control of CBL to Adjust Polymer Properties

EXAMPLE 1a

Preparation of Chromium Catalyst (Reference PIX152)

Into a fluidized bed reactor supplied with a fluidisation gas (gas velocity varied between 4 to 7 cm/s) composed of nitrogen containing less than 2 vpm of water vapor, were charged 20 kg of a granular chromium catalyst sold under the trade name EP30XA by Ineos Silicas (Warrington, England). The characteristics of this catalyst are given in table 1. Next the reactor was heated from ambient temperature to 150° C. at a rate of 1.5° C./mn. The catalyst was then maintained at 150° C. for at least 60 mn in the fluidised state. Next 4.8 kg of a mixture of isopropyl titanate and n-butyl titanate sold under the trade name "Tilcom BIP" by Titanium Intermediates Limited (Billingham, England) were introduced into the reactor. The reactor was then maintained at 150° C. for 2 hours. The reactor was then heated from 150° C. to 300° C. at a rate of 1.5° C./min.

Next the fluidisation by dry nitrogen was changed to fluidisation by dry air. Next the catalyst was heated to 815° C. at 1.5° C./mn then maintained at 815° C. for 5 h in the fluidised state. Next the catalyst was cooled to 300° C. (the temperature decrease slope is between 0.25 to 1.5° C./mn). Next the fluidisation by dry air was changed to fluidisation by dry nitrogen and the catalyst was cooled to room temperature and stored under dry nitrogen.

16 kg of an active catalyst containing 0.25% by weight of chromium and 4% by weight of titanium were recovered

EXAMPLE 1b

Pilot Scale Process Operation

A fluidised bed reactor 74 cm in diameter was used for the polymerisations. This contained a fluidised bad and was operated at 100.7° C. using catalyst PIX152 described above. The gas phase was composed of hydrogen, nitrogen, pentane and ethylene fluidised at 48 cm/s. The flow of the activity enhancer Tri Ethyl Aluminium was set to a value of 0.016 moles of TEA per ton of ethylene. The polymer yield was set at 4109 g of polyethylene per gram of catalyst introduced into the reactor and the polymer melt index as measured under 2.16 kg was adjusted to be within the target range of 0.4-0.7. After a period of stabilisation a sample of the product was taken and the CBL was analysed. This data along with the partial pressures of the components of the gas mixture, reactor temperature, catalyst and ethylene feed rate and the drop impact value of the polymer are given in condition 1 in the attached table.

The total level of SCB was outside the target window for a product with a drop impact as measured in metres of at least 2 m. To achieve the target drop impact, the CBL was adjusted by raising the hydrogen partial pressure to 5 b. and reactor temperature adjusted to maintain the polymer melt index as measured under 2.16 kg within the target range of 0.4-0.7 A sample of the product was taken and the CBL and drop impact were analysed and the product properties were found to correspond to the targets. This data along with the partial pressures of the components of the gas mixture, reactor temperature, catalyst and ethylene feed rate are given in condition 2 in the attached table.

| | | Example 1 | |
|---|---|---|---|
| Parameter | Units | Condition 1 Sample n° 01L10073 | Condition 2 Sample N° 01L10075 |
| Reactor pressure | bar g | 20.1 | 20.1 |
| Ethylene partial pressure | Bar | 7.2 | 6.16 |
| Hydrogen partial pressure | Bar | 1 | 5 |
| Pentane partial pressure | Bar | 2.08 | 2.12 |
| Reaction temperature | Bar | 101.1 | 100.3 |
| Ethylene feed rate | kg/hr | 100 | 100 |
| Bed height | M | 4.97 | 4.88 |
| Fluidisation gas velocity | cm/s | 48.05 | 48.05 |
| KTEA | Mol TEA/Tonne Ethylene feed | 0.016 | 0.016 |
| Catalyst productivity | g polyethylene/g catalyst | 4109 | 4332 |
| Polymer MI | MI(2.16 kg) | 0.52 | 0.47 |
| Drop Impact | M | 1.17 | 2.45 |
| CBL | Total CBL per 1000 carbons | 2.5 | 1.7 |

The above example shows how measuring and controlling the CBL of the product can adjust product properties. CBL is measured by NMR.

EXAMPLE 2

Measurement and Control of CBL to Adjust Polymer Properties

EXAMPLE 2a

Preparation of Chromium Catalyst (Reference PIX147)

Into a fluidized bed reactor supplied with a fluidisation gas (gas velocity varied between 4 to 7 cm/s) composed of nitrogen containing less than 2 vpm of water vapor, were charged 15 kg of a granular chromium catalyst sold under the trade name EP30XA by Ineos Silicas (Warrington, England). The characteristics of this catalyst are given in table 1. Next the reactor was heated from ambient temperature to 150° C. at a rate of 1.5° C./mn. The catalyst was then maintained at 150° C. for at least 60 mn in the fluidised state. Next 3.6 kg of a mixture of isopropyl titanate and n-butyl titanate sold under the trade name "Tilcom BIP" by Titanium Intermediates Limited (Billingham, England) were introduced into the reactor. The reactor was then maintained at 150° C. for 2 hours. The reactor was then heated from 150° C. to 300° C. at a rate of 1.5° C./mn.

Next the fluidisation by dry nitrogen was changed to fluidisation by dry air. Next the catalyst was heated to 815° C. at 81.5° C./mn then maintained at 815° C. 5 h in the fluidised state. Next the catalyst was cooled to 300° C. (the temperature decrease slope is between 0.25 to 1.5° C./mn). Next the fluidisation by dry air was changed to fluidisation by dry nitrogen and the catalyst was cooled to room temperature and stored under dry nitrogen.

13.8 kg of an active catalyst containing 0.25% by weight of chromium and 4% by weight of titanium were recovered

EXAMPLE 2b

Pilot Scale Process Operation

A fluidised bed reactor 74 cm in diameter was used for the polymerisations. This contained a fluidised bad and was operated at 103.9° C. using catalyst PIX 147 described above. The gas phase was composed of hydrogen, nitrogen, pentane and ethylene fluidised at 45.4 cm/s. The polymer yield was set at 5111 g of polyethylene per gram of catalyst introduced into the reactor and the polymer melt index as measured under 2.16 kg was adjusted to be within the target range of 0.4-0.7. After a period of stabilisation a sample of the product was taken and the CBL was analysed. This data along with the partial pressures of the components of the gas mixture, reactor temperature, catalyst and ethylene feed rate and Charpy Impact value of the polymer are given in condition 1 in the attached table.

The total level of SCB was outside the target window for a product with a Charpy impact of at least 16 KJ/m2. To achieve the target Charpy impact, the CBL was adjusted by raising the catalyst yield to 13548 grams of polyethylene per gram of catalyst. The reactor temperature adjusted to maintain the polymer melt index as measured under 2.16 kg within the target range of 0.4-0.7 and the flow of the activity enhancer Tri Ethyl Aluminium was set to a value of 0.016 moles of TEA per ton of ethylene. A sample of the product was taken and the CBL and charpy impact were analysed and the product properties were found to correspond to the targets. This data along with the partial pressures of the components of the gas mixture, reactor temperature, catalyst and ethylene feed rate are given in condition 2 in the attached table.

| Example 2 | | | |
|---|---|---|---|
| Parameter | Units | Condition 1 Sample n° C46211 | Condition 2 Sample N° C46222 |
| Reactor pressure | bar g | 20.3 | 20.2 |
| Ethylene partial pressure | bar | 11.81 | 12.95 |
| Hydrogen partial pressure | bar | 2 | 2 |
| Pentane partial pressure | bar | 0.53 | 0.49 |
| Bed height | m | 4.98 | 4.99 |
| Fluidisation gas velocity | cm/s | 45.4 | 46.65 |
| KTEA | Mol TEA/Tonne Ethylene feed | 0.0 | 0.033 |
| Catalyst yield | g polyethylene/g catalyst | 5111 | 13548 |
| Polymer MI | MI(2.16 kg) | 0.64 | 0.44 |
| Polymer density non annealed | Kg/m3 | 958 | 957 |
| Charpy Impact | KJ/m2 | 10.4 | 22.8 |
| CBL | Total CBL per 1000 carbons | 2.8 | 2.1 |

The above example shows how measuring and controlling the CBL of the product can adjust product properties.

EXAMPLE 3

CBL Control by Changing Catalyst Yield

Catalyst No 1 Chromium Catalyst Preparation (Reference 784)

The equipment used for the catalyst preparation is composed essentially of a vertical quartz cylinder reactor, 75 cm high and 5 cm in diameter, above which is placed a disengagement zone. This reactor is equipped with a fluidisation grid made from porous quartz and positioned in the lower part of the quartz cylinder. It is also equipped with an electrical resistance heater and a supply of fluidisation gas.

Into the reactor maintained at 60° C. and supplied with a fluidisation gas composed of nitrogen containing less than 2 vpm of water vapour and with a flow rate of 4.7 ml/s are charged 20 g of a granular chromium catalyst sold under the trade name EP30XA by Ineos Silicas (Warrington, England). The characteristics of this catalyst are described in Table 1. Next the reactor is heated from 60° C. to 150° C. at a rate of 100° C./h. The catalyst is then maintained at 150° C. for 2 hours in the fluidised state. Next 4.5 ml of a mixture of isopropyl titanate and n-butyl titanate sold under the trade name "Tilcom BIP" by Titanium Intermediates Limited (Billingham, England) are introduced into the reactor. The reactor is then maintained at 150° C. for 2 hours. The reactor is then heated from 150° C. to 300° C. at a rate of 100° C./h. The catalyst is then maintained at 300° C. for 2 hours in the fluidised state. Next the fluidisation by dry nitrogen is changed to fluidisation by dry air. Next the catalyst is heated to 815° C. at 100° C./h then maintained at 815° C. for 5 hours in the fluidised state. Next the catalyst is cooled to 300° C. at 100° C./h. Next the fluidisation by dry air is changed to fluidisation by dry nitrogen and the catalyst is cooled to room temperature and stored under dry nitrogen.

21 g of an active catalyst containing 0.25% by weight of chromium and 4% by weight of titanium are recovered.

Reaction 3(a) Gas Phase Ethylene Polymerisation at Catalyst Yield 2005 g/g (Reference F3014)

400 g of polyethylene pellets were introduced into a stainless steel reactor of capacity 2.5 litres equipped with a stirrer and maintained under a nitrogen atmosphere. The reactor was heated to 104.4° C. and stirred at 25 rpm. Next 0.7 g of silica previously treated with 1.5 mmole/g of triethylaluminium was added as poison scavenger followed by 0.260 g of the catalyst No 1, reference 784. Next hydrogen was introduced to pressurise the reactor to 0.1 MPa. Finally ethylene was fed until a total pressure of 0.8 MPa was obtained. Ethylene was fed to maintain this pressure throughout the reaction. After production corresponding to 50 g polyethylene per gram of catalyst the stirring rate was increased to 100 rpm, after the production of 50 g of polyethylene the stirring rate was increased further to 150 rpm and after the production of 100 g of polyethylene the stirring rate was increased further to 200 rpm.

Polymerisation was allowed to continue for 3 hours and 29 minutes, during which period 513 g of polyethylene were produced. This corresponds to a catalyst yield of 2005 g polymer/g catalyst and an average catalyst activity of 1823 g/mM.h.b. The reactor contents were cooled to 25° C. and were then recovered from the reactor. A sieve with 2 mm diameter mesh was used to separate the polyethylene pellets from the powder formed during the reaction. The properties of the recovered polymer powder are given in Table 2:

Reaction 3(b) Gas Phase Ethylene Polymerisation at Catalyst Yield 8007 g/g (Reference F3062)

400 g of polyethylene pellets were introduced into a stainless steel reactor of capacity 2.5 litres equipped with a stirrer and maintained under a nitrogen atmosphere. The reactor was heated to 103.3° C. Next 0.7 g of silica previously treated with 1.5 mmole/g of triethylaluminium was added as poison scavenger followed by 0.054 g of catalyst No 1, reference 784. Next hydrogen was introduced to pressurise the reactor to 0.1 MPa. Finally ethylene was fed until a total pressure of 0.8 MPa was obtained. Ethylene was fed to maintain this pressure throughout the reaction. After production corresponding to 50 g polyethylene per gram of catalyst the stirring rate was increased to 100 rpm, after the production of 50 g of polyethylene the stirring rate was increased further to 150 rpm and after the production of 100 g of polyethylene the stirring rate was increased further to 200 rpm.

Polymerisation was allowed to continue for 5 hours and 40 minutes, during which period 433 g of polyethylene were produced. This corresponds to a catalyst yield of 8000 g polymer/g catalyst and an average catalyst activity of 4019 g/mM.h.b. The reactor contents were cooled to 25° C. and were then recovered from the reactor. A sieve with 2 mm diameter mesh was used to separate the polyethylene pellets from the powder formed during the reaction.

The properties of the recovered polymer powder are given in Table 2

EXAMPLE 4

CBL Control by Changing Catalyst Activation Temperature

Catalyst No 2 Chromium Catalyst Preparation (Reference 788)

The equipment used for the catalyst preparation is composed essentially of a vertical quartz cylinder reactor, 75 cm high and 5 cm in diameter, above which is placed a disengagement zone. This reactor is equipped with a fluidisation grid made from porous quartz and positioned in the lower part of the quartz cylinder. It is also equipped with an electrical resistance heater and a supply of fluidisation gas.

Into the reactor maintained at 60° C. and supplied with a fluidisation gas composed of nitrogen containing less than 2 vpm of water vapour and with a flow rate of 4.7 ml/s are charged 20 g of a granular chromium catalyst sold under the trade name EP30X by Ineos Silicas (Warrington, England). The characteristics of this catalyst are given in Table 1. Next the reactor is heated from 60° C. to 150° C. at a rate of 100° C./h. The catalyst is then maintained at 150° C. for 2 hours in the fluidised state. Next 4.85 ml of a mixture of isopropyl titanate and n-butyl titanate sold under the trade name "Tilcom BIP" by Titanium Intermediates Limited (Billingham, England) are introduced into the reactor. The reactor is then maintained at 150° C. for 2 hours. The reactor is then heated from 150° C. to 300° C. at a rate of 100° C./h. The catalyst is then maintained at 300° C. for 2 hours in the fluidised state. Next the fluidisation by dry nitrogen is changed to fluidisation by dry air. Next the catalyst is heated to 500° C. at 100° C./h then maintained at 500° C. for 5 hours in the fluidised state. Next the catalyst is cooled to 300° C. at 100° C./h. Next the fluidisation by dry air is changed to fluidisation by dry nitrogen and the catalyst is cooled to room temperature and stored under dry nitrogen.

21 g of an active catalyst containing 1.0% by weight of chromium and 4.2% by weight of titanium are recovered.

Reaction 4(a) Gas Phase Ethylene Polymerisation at Catalyst Yield 2005 g/g, Catalyst Activation Temperature 500° C. (Reference F2939)

400 g of polyethylene pellets were introduced into a stainless steel reactor of capacity 2.5 litres equipped with a stirrer and maintained under a nitrogen atmosphere. The reactor was heated to 103.1° C. and stirred at 25 rpm. Next 0.7 g of silica previously treated with 1.5 mmole/g of triethylaluminium was added as poison scavenger followed by 0.150 g of the above catalyst No 2, reference 788. Next hydrogen was introduced to pressurise the reactor to 0.1 MPa. Finally ethylene was fed until a total pressure of 0.8 MPa was obtained. Ethylene was fed to maintain this pressure throughout the reaction. After production corresponding to 50 g polyethylene per gram of catalyst the stirring rate was increased to 100 rpm, after the production of 50 g of polyethylene the stirring rate was increased further to 150 rpm and after the production of 100 g of polyethylene the stirring rate was increased further to 200 rpm.

Polymerisation was allowed to continue for 2 hours and 4 minutes, during which period 316 g of polyethylene were produced. This corresponds to a catalyst yield of 2170 g polymer/g catalyst and an average catalyst activity of 809 g/mM.h.b. The reactor contents were cooled to 25° C. and were then recovered from the reactor. A sieve with 2 mm diameter mesh was used to separate the polyethylene pellets from the powder formed during the reaction. The properties of the recovered polymer powder are given in Table 2:

Catalyst No 3 Chromium Catalyst Preparation (Reference 703)

The equipment used for the catalyst preparation is composed essentially of a vertical quartz cylinder reactor, 75 cm high and 5 cm in diameter, above which is placed a disengagement zone. This reactor is equipped with a fluidisation grid made from porous quartz and positioned in the lower part of the quartz cylinder. It is also equipped with an electrical resistance heater and a supply of fluidisation gas.

Into the reactor maintained at 60° C. and supplied with a fluidisation gas composed of nitrogen containing less than 2 vpm of water vapour and with a flow rate of 4.7 ml/s are charged 20 g of a granular chromium catalyst sold under the trade name EP30X by Ineos Silicas (Warrington, England). The characteristics of this catalyst are given in Table 1. Next the reactor is heated from 60° C. to 150° C. at a rate of 100° C./h. The catalyst is then maintained at 150° C. for 2 hours in the fluidised state. Next 4.85 ml of a mixture of isopropyl titanate and n-butyl titanate sold under the trade name "Tilcom BIP" by Titanium Intermediates Limited (Billingham, England) are introduced into the reactor. The reactor is then maintained at 150° C. for 2 hours. The reactor is then heated from 150° C. to 300° C. at a rate of 100° C./h. The catalyst is then maintained at 300° C. for 2 hours in the fluidised state. Next the fluidisation by dry nitrogen is changed to fluidisation by dry air. Next the catalyst is heated to 815° C. at 100° C./h then maintained at 815° C. for 5 hours in the fluidised state. Next the catalyst is cooled to 300° C. at 100° C./h. Next the fluidisation by dry air is changed to fluidisation by dry nitrogen and the catalyst is cooled to room temperature and stored under dry nitrogen.

21 g of an active catalyst containing 1.0% by weight of chromium and 4.2% by weight of titanium are recovered.

EXAMPLE 4(b)

Gas phase ethylene polymerisation at catalyst yield 2023 g/g, catalyst activation temperature 815° C. (reference F2949) 400 g of polyethylene pellets were introduced into a stainless steel reactor of capacity 2.5 litres equipped with a stirrer and maintained under a nitrogen atmosphere. The reactor was heated to 104.4° C. and stirred at 25 rpm. Next 0.7 g of silica previously treated with 1.5 mmole/g of triethylaluminium was added as poison scavenger followed by 0.210 g of catalyst No 3 reference 703. Next hydrogen was introduced to pressurise the reactor to 0.1 MPa. Finally ethylene was fed until a total pressure of 0.8 MPa was obtained. Ethylene was fed to maintain this pressure throughout the reaction. After production corresponding to 50 g polyethylene per gram of catalyst the stirring rate was increased to 100 rpm, after the production of 50 g of polyethylene the stirring rate was increased further to 150 rpm and after the production of 100 g of polyethylene the stirring rate was increased further to 200 rpm.

Polymerisation was allowed to continue for 1 hours and 41 minutes, during which period 427 g of polyethylene were produced. This corresponds to a catalyst yield of 2023 g polymer/g catalyst and an average catalyst activity of 969 g/mM.h.b. The reactor contents were cooled to 25° C. and were then recovered from the reactor. A sieve with 2 mm diameter mesh was used to separate the polyethylene pellets from the powder formed during the reaction.

The properties of the recovered polymer powder are given in Table 2:

EXAMPLE 5

CBL Control By Changing Catalyst Form

Catalyst No 1 Chromium Catalyst Preparation (Reference 784)
See description in Example 3
Reaction 5(a) Gas Phase Ethylene Polymerisation at Catalyst Yield 7276 g/g, Catalyst Activation Temperature 815° C., Granular Catalyst (Reference F3107)

400 g of polyethylene pellets were introduced into a stainless steel reactor of capacity 2.5 litres equipped with a stirrer and maintained under a nitrogen atmosphere. The reactor was heated to 114° C. and stirred at 25 rpm. Next 0.7 g of silica previously treated with 1.5 mmole/g of triethylaluminium was added as poison scavenger followed by 0.029 g of catalyst No 1 reference 784. Next the reactor was placed under a hydrogen atmosphere. Next hydrogen was added to pressurise the reactor to 0.1 MPa. Finally ethylene was fed until a total pressure of 0.8 MPa was obtained. Ethylene was fed to maintain this pressure throughout the reaction. After production corresponding to 50 g polyethylene per gram of catalyst the stirring rate was increased to 100 rpm, after the production of 50 g of polyethylene the stirring rate was increased further to 150 rpm and after the production of 100 g of polyethylene the stirring rate was increased further to 200 rpm.

Polymerisation was allowed to continue for 6 hours and 20 minutes, during which period 211 g of polyethylene were produced. This corresponds to a catalyst yield of 7276 g polymer/g catalyst and an average catalyst activity of 3392 g/mM.h.b. The reactor contents were cooled to 25° C. and were then recovered from the reactor. A sieve with 2 mm diameter mesh was used to separate the polyethylene pellets from the powder formed during the reaction. The properties of the recovered polymer powder are given in Table 2:

Catalyst No 4 Chromium Catalyst Preparation (Reference 785)

The equipment used for the catalyst preparation is composed essentially of a vertical quartz cylinder reactor, 75 cm high and 5 cm in diameter, above which is placed a disengagement zone. This reactor is equipped with a fluidisation grid made from porous quartz and positioned in the lower part of the quartz cylinder. It is also equipped with an electrical resistance heater and a supply of fluidisation gas.

Into the reactor maintained at 60° C. and supplied with a fluidisation gas composed of nitrogen containing less than 2 ppm of water vapour and with a flow rate of 4.7 ml/s are charged 20 g of a microspheroidal chromium catalyst sold under the trade name ES370YA by Ineos Silicas (Warrington, England). The characteristics of this catalyst are given in table 1. Next the reactor is heated from 60° C. to 150° C. at a rate of 100° C./h. The catalyst is then maintained at 150° C. for 2 hours in the fluidised state. Next 4.5 ml of a mixture of isopropyl titanate and n-butyl titanate sold under the trade name "Tilcom BIP" by Titanium Intermediates Limited (Billingham, England) are introduced into the reactor. The reactor is then maintained at 150° C. for 2 hours. The reactor is then heated from 150° C. to 300° C. at a rate of 100° C./h. The catalyst is then maintained at 300° C. for 2 hours in the fluidised state. Next the fluidisation by dry nitrogen is changed to fluidisation by dry air. Next the catalyst is heated to 815° C. at 100° C./h then maintained at 815° C. for 5 hours in the fluidised state. Next the catalyst is cooled to 300° C. at 100° C./h. Next the fluidisation by dry air is changed to fluidisation by dry nitrogen and the catalyst is cooled to room temperature and stored under dry nitrogen.

21 g of an active catalyst containing 0.25% by weight of chromium and 4% by weight of titanium are recovered.

Reaction 5(b) Gas Phase Ethylene Polymerisation at Catalyst Yield 8000 g/g, Catalyst Activation Temperature 815° C., Microspheroidal Catalyst (Reference F3093)

400 g of polyethylene pellets were introduced into a stainless steel reactor of capacity 2.5 litres equipped with a stirrer and maintained under a nitrogen atmosphere. The reactor was heated to 104.4° C. and stirred at 25 rpm. Next 0.7 g of silica previously treated with 1.5 mmole/g of triethylaluminium was added as poison scavenger followed by 0.064 g of the above catalyst No 4 reference 785. Next the reactor was placed under a hydrogen atmosphere. Next hydrogen was added to pressurise the reactor to 0.1 MPa. Finally ethylene was fed until a total pressure of 0.8 MPa was obtained. Ethylene was fed to maintain this pressure throughout the reaction. After production corresponding to 50 g polyethylene per gram of catalyst the stirring rate was increased to 100 rpm, after the production of 50 g of polyethylene the stirring rate was increased further to 150 rpm and after the production of 100 g of polyethylene the stirring rate was increased further to 200 rpm.

Polymerisation was allowed to continue for 4 hours and 52 minutes, during which period 512 g of polyethylene were produced. This corresponds to a catalyst yield of 8000 g polymer/g catalyst and an average catalyst activity of 4525 g/mM.h.b. The reactor contents were cooled to 25° C. and were then recovered from the reactor. A sieve with 2 mm diameter mesh was used to separate the polyethylene pellets from the powder formed during the reaction. The properties of the recovered polymer powder are given in Table 2:

EXAMPLE 6

CBL Control by Fluorination of the Catalyst

Chromium Catalyst Preparation No 5 (Reference 802)

The equipment used for the catalyst preparation is composed essentially of a vertical quartz cylinder reactor, 75 cm high and 5 cm in diameter, above which is placed a disengagement zone. This reactor is equipped with a fluidisation grid made from porous quartz and positioned in the lower part of the quartz cylinder. It is also equipped with an electrical resistance heater and a supply of fluidisation gas.

Into the reactor maintained at 60° C. and supplied with a fluidisation gas composed of nitrogen containing less than 2 ppm of water vapour and with a flow rate of 4.7 ml/s are charged 20 g of a granular chromium catalyst sold under the trade name EP30XA by Ineos Silicas (Warrington, England). The characteristics of this catalyst are given in table 1. Next the reactor is heated from 60° C. to 150° C. at a rate of 100° C./h. The catalyst is then maintained at 150° C. for 2 hours in the fluidised state. Next 0.051 g of hexafluorosilyl ammonium (Riedel De Haën) are introduced into the reactor. Next 4.5 ml of a mixture of isopropyl titanate and n-butyl titanate sold under the trade name "Tilcom BIP" by Titanium Intermediates Limited (Billingham, England) are introduced into the reactor. The reactor is then maintained at 150° C. for 2 hours. The reactor is then heated from 150° C. to 300° C. at a rate of 100° C./h. The catalyst is then maintained at 300° C. for 2 hours in the fluidised state. Next the fluidisation by dry nitrogen is changed to fluidisation by dry air. Next the catalyst is heated to 815° C. at 100° C./h then maintained at 815° C. for 5 hours in the fluidised state. Next the catalyst is cooled to 300° C. at 100° C./h. Next the fluidisation by dry air is changed to fluidisation by dry nitrogen and the catalyst is cooled to room temperature and stored under dry nitrogen.

21 g of an active catalyst containing 0.25% by weight of chromium, 4% by weight of titanium and 0.163% by weight of fluorine are recovered.

Reaction 6(a) Gas Phase Ethylene Polymerisation at Catalyst Yield 8113 g/g, Catalyst Activation Temperature 815° C. Granular Catalyst APS 110 Microns 0.163% Fluorine (Reference F3102)

400 g of polyethylene pellets were introduced into a stainless steel reactor of capacity 2.5 litres equipped with a stirrer and maintained under a nitrogen atmosphere. The reactor was heated to 112.4° C. and stirred at 25 rpm. Next 0.7 g of silica previously treated with 1.5 mmole/g of triethylaluminium was added as poison scavenger followed by 0.062 g of the above catalyst No 5, reference 802. Next the reactor was placed under a hydrogen atmosphere. Next hydrogen was added to pressurise the reactor to 0.1 MPa. Finally ethylene was fed until a total pressure of 0.8 MPa was obtained. Ethylene was fed to maintain this pressure throughout the reaction. After production corresponding to 50 g polyethylene per gram of catalyst the stirring rate was increased to 100 rpm, after the production of 50 g of polyethylene the stirring rate was increased further to 150 rpm and after the production of 100 g of polyethylene the stirring rate was increased further to 200 rpm.

Polymerisation was allowed to continue for 4 hours and 48 minutes, during which period 503 g of polyethylene were produced. This corresponds to a catalyst yield of 8113 g polymer/g catalyst and an average catalyst activity of 4940 g/mM.h.b. The reactor contents were cooled to 25° C. and were then recovered from the reactor. A sieve with 2 mm diameter mesh was used to separate the polyethylene pellets from the powder formed during the reaction. The recovered polymer powder are given in Table 2

Catalyst No 1 Chromium Catalyst Preparation (Reference 784)

See description in Example 3

Reaction 6(b) Gas Phase Ethylene Polymerisation at Catalyst Yield 8007 g/g Catalyst Activation Temperature 815° C., Granular Catalyst (Reference F3062)

See description in reaction 3b

TABLE 1

Catalyst and silica characteristics

| Name | Supplier | Surface Area $m^2/g$ | Pore volume ml/g | Average particle size microns | Average pore diameter $A°$ | Shape | Chromium content wt % |
|---|---|---|---|---|---|---|---|
| EP30X | Ineos Silicas (Warrington, England) | 330 | 1.67 | 110 | 200 | Granular | 1 |
| EP30XA | Ineos Silicas (Warrington, England) | 330 | 1.67 | 110 | 200 | Granular | 0.25 |
| ES370YA | Ineos Silicas (Warrington, England) | 330 | 1.67 | 95 | 200 | Microspheroidal | 0.25 |

TABLE 2

Polymer characteristics

| | | Example 3 | | Example 4 | | Example 5 | | Example 6 | |
|---|---|---|---|---|---|---|---|---|---|
| Run N° | | 3a (Ref F3014) | 3b (Ref F3062) | 4a (Ref F2939) | 4b (Ref F2949) | 5a (Ref F3107) | 5b (Ref F3093) | 7a (Ref F3102) | 7b (Ref F3062) |
| Catalyst type | | EP30XA | EP30XA | EP30X | EP30X | EP30XA | ES370YA | EP30XA | EP30XA |
| Catalyst activation temperature | °C. | 815 | 815 | 500 | 815 | 815 | 815 | 815 | 815 |
| Fluorine level | % | | | | | | | 0.163 | |
| Catalyst reference N° | | 784 | 784 | 788 | 703 | 784 | 785 | 802 | 784 |
| Catalyst Yield | g polymer/g cata | 2005 | 8007 | 2170 | 2023 | 7276 | 8000 | 8113 | 8007 |
| Residual chromium level | ppm | 1.2 | 0.31 | 4.6 | 4.9 | 0.34 | 0.31 | 0.31 | 0.31 |
| Melt Index(2.16 kg) | G/10 min | 0.31 | 0.331 | 0.258 | 0.192 | 0.666 | 0.716 | 0.649 | 0.331 |
| Melt Index(21.6 kg) | G/10 min | 21.7 | 22.6 | 26.8 | 21.7 | 41.54 | 47.11 | 42.09 | 22.6 |
| Unannealed powder density | Kg/m3 | | 957 | | | 956.5 | 959.1 | 958.4 | 957 |
| CBL | Branches/ 100° C. | 2.4 | 1.5 | 3.9 | 2.1 | 1.4 | 1.2 | 1.4 | 1.5 |

The invention claimed is:

1. A process for controlling the (co)polymerization of olefins in a continuous polymerization reactor comprising:
   a) performing olefin (co)polymerization in the presence of a polymerization catalyst in a continuous polymerization reactor;
   b) selecting the operating conditions for the production of a given polymer grade;
   c) measuring the value of the chain branching level (CBL) of said produced polymer; and
   d) taking one or more actions with respect to the operating conditions to maintain the value of the CBL within a range of 1 to 7 to thereby control the flexural modulus of the polymer produced to between 700 and 1400 MPa.

2. A process for controlling a continuous fluidized bed reactor (co)polymerization process which comprises
   a) (co)-polymerizing an olefin in a polymerization zone of a fluidized bed reactor in the presence of a polymerization catalyst under reactive conditions,
   b) withdrawing from the reactor a hot recycle stream containing at least an olefin,
   c) cooling part or all of said recycle stream withdrawn from said reactor,
   d) recycling part or all of said cooled recycle stream containing the olefin through the polymerization zone in said reactor in the presence of a polymerization catalyst under reactive conditions,
   e) determining the value of the chain branching level (CBL) of a polymer produced, and
   f) adjusting said reactive conditions to maintain said value of the CBL within a range of 1 to 7 to thereby control the flexural modulus of the polymer produced to between 700 and 1400 MPa.

3. The process according to claim 1, wherein the CBL is increased or decreased by increasing or decreasing the catalyst yield.

4. The process according to claim 2, wherein the CBL is increased or decreased by increasing or decreasing the catalyst yield.

5. The process according to claim 1, wherein the polymerization catalyst is a high activity chromium catalyst consisting of a chromium oxide activated by heat treatment and associated with a granular or microspheroidal support based on a refractory oxide.

6. The process according to claim 2, wherein the polymerization catalyst is a high activity chromium catalyst consisting of a chromium oxide activated by heat treatment and associated with a granular or microspheroidal support based on a refractory oxide.

* * * * *